US006973693B1

(12) United States Patent
Mayer et al.

(10) Patent No.: US 6,973,693 B1
(45) Date of Patent: Dec. 13, 2005

(54) DOCK LEVELER ASSEMBLY WITH ADJUSTABLE AUTOMATIC RELEASE

(75) Inventors: William B. Mayer, Sussex, WI (US); Thomas A. Cinealis, Milwaukee, WI (US); David C. Hintze, Cudahy, WI (US)

(73) Assignee: Multi-Fab Products, LLC, Menomonee Falls, WI (US)

( * ) Notice: Subject to any disclaimer, the term of this patent is extended or adjusted under 35 U.S.C. 154(b) by 0 days.

(21) Appl. No.: 10/442,415

(22) Filed: May 21, 2003

(51) Int. Cl.[7] ............................................. E01D 1/00
(52) U.S. Cl. ..................................... 14/71.3; 14/71.1
(58) Field of Search .......................... 14/69.5, 71.1, 14/71.3

(56) References Cited

U.S. PATENT DOCUMENTS

| 3,500,486 | A | * | 3/1970 | LeClear ...................... 14/71.3 |
| 3,646,627 | A | * | 3/1972 | Potter ......................... 14/71.3 |
| 3,882,563 | A | * | 5/1975 | Smith et al. ................. 14/71.3 |
| 3,967,337 | A | * | 7/1976 | Artzberger .................. 14/71.5 |
| 4,531,248 | A | * | 7/1985 | Swessel et al. .............. 14/71.3 |
| 4,603,461 | A | * | 8/1986 | Whippie et al. ............. 29/227 |
| 4,630,989 | A | * | 12/1986 | Davey ........................ 414/401 |

(Continued)

OTHER PUBLICATIONS

"Owners Manual, Installation-Operation-Service-Parts For RH "B" Series Dock Levelers★", Pub. 021R2, Nov. 1983, Rite-Hite Corporation, 9019 N. Deerwood Drive, Milwaukee, WI 53223.

Primary Examiner—Gary Hartmann
(74) Attorney, Agent, or Firm—Boyle, Fredrickson, Newholm, Stein & Gratz, S.C.

(57) ABSTRACT

A dock leveler assembly includes a base and a ramp that is pivotably movable under the influence of a biasing arrangement to a raised position. The ramp is lowered into engagement with a truck bed, preferably via a lip connected to the outer end of the ramp, and a holddown assembly maintains the ramp in a lowered position during loading and unloading of the truck bed against the force of a biasing arrangement that urges the ramp toward a raised position. The holddown assembly includes an extendible and retractable mechanism which is selectively fixed in position to maintain the ramp in a desired position. A "float" apparatus using a compression spring accommodates a certain amount of vertical movement of the ramp as the truck bed moves up and down during loading and unloading. A release arrangement enables the holddown assembly to be extended and retracted, and includes an automatic actuating arrangement that allows the mechanism to be extended upon application of a selected upward force to the ramp when the ramp is in a lowered position. The automatic actuating arrangement includes a flexible member such as a chain, and an adjustment arrangement for adjusting the inoperative position of the release member so as to control the degree of movement of the release member that is required in order to move the release member to the operative position from the inoperative position. The adjustment arrangement may be in the form of a threaded connection between one end of the actuating member and the release member, for selectively varying the inoperative position of the release member. The purpose of the adjustment is to control the amount of upward force that is required to actuate the release member, in order to avoid premature release and to avoid damage that can occur if the release does not occur until after an excessive upward force is applied.

6 Claims, 4 Drawing Sheets

U.S. PATENT DOCUMENTS

| | | | |
|---|---|---|---|
| 4,823,421 A * | 4/1989 | Kleynjans et al. | 14/71.3 |
| 5,000,268 A * | 3/1991 | Zimmerman | 172/240 |
| 5,303,443 A * | 4/1994 | Alexander | 14/71.1 |
| 5,323,503 A * | 6/1994 | Springer | 14/71.3 |
| 5,335,451 A * | 8/1994 | Druzynski | 49/379 |
| 5,416,941 A * | 5/1995 | Hageman | 14/71.7 |
| 5,575,492 A * | 11/1996 | Stone | 280/475 |
| 6,061,859 A * | 5/2000 | Winter | 14/71.3 |
| 6,125,491 A * | 10/2000 | Alexander | 14/69.5 |
| 6,317,914 B1 * | 11/2001 | Preston | 14/71.3 |
| 6,481,038 B2 * | 11/2002 | Lounsbury et al. | 14/71.1 |
| 6,698,052 B2 * | 3/2004 | Stolk | 14/71.7 |

* cited by examiner

DOCK LEVELER ASSEMBLY WITH ADJUSTABLE AUTOMATIC RELEASE

BACKGROUND AND SUMMARY OF THE INVENTION

This invention related to a dock leveler mechanism including an upwardly biased ramp that is pivotably interconnected with a base for movement between raised and lowered positions, and more particularly to an automatic release feature for a holddown mechanism that selectively maintains the ramp in a lowered position and enables upward movement of the ramp in response to application of an upward force on the ramp when the ramp is in a lowered position.

A dock leveler assembly typically includes a base mounted to a loading dock or the like, and a ramp pivotably mounted to the base for movement between raised and lowered positions. A biasing arrangement, such as a spring arrangement, is interposed between the ramp and the base for biasing the ramp upwardly toward a raised position. A holddown mechanism is interposed between the base and the ramp, for selectively maintaining the ramp in a lowered position, such as when the outer end of the ramp is engaged with the bed of a truck to enable unloading of the truck. When the dock leveler is not in use, the holddown mechanism maintains the ramp in a position level with the dock against the force of the biasing arrangement. The holddown mechanism typically includes a first member that is pivotably interconnected with the base and a second member that is extendible and retractable relative to the first member and that is pivotably interconnected with the ramp. A releasable engagement arrangement is interposed between the first and second members, for selectively fixing the position of the second member relative to the first member and thereby maintaining the position of the ramp relative to the base, for maintaining the ramp in a lowered position against the force of the biasing arrangement.

The holddown mechanism includes a release member that interacts with the releasable engagement arrangement, for selectively disengaging the releasable engagement arrangement to enable the second member to be extended relative to the first member, and to thereby allow the ramp to be moved to a raised position. The release member is movable from an inoperative position, in which the releasable engagement arrangement is engaged, and an operative position in which the releasable engagement arrangement is disengaged to allow extension of the second member. The release member can be manually moved to the operative position via a manual actuator arrangement, which may be in the form of a cable, chain or the like, that can be pulled by an operator so as to pivot the release member from the inoperative position to the operative position. In addition, the release member may be movable to the operative position in response to application of an upward force on the ramp while the ramp is in a lowered position, e.g. as a result of the truck bed moving upwardly during loading or unloading of the truck. In the past, the automatic release arrangement has included a length of chain connected at one end to a pin through which the first member of the holddown mechanism is mounted to the base, and connected at another end to an outer end defined by the release member. The chain is intended to operate as an automatic release actuator to move the release member to the operative position when an upward force is applied on the ramp, to enable the second member to be extended and to thereby allow the ramp to be raised under the influence of the biasing arrangement. While a fixed length chain of this type is capable of providing satisfactory operation of an automatic release mechanism, it has been found that, in practice, this type of automatic release actuator provides unpredictable and inconsistent performance, primarily due to the large number of high tolerance components (i.e. components that do not have closely controlled tolerances) incorporated in the release mechanism and the chain and the hardware used to mount the chain. Such lack of close tolerances can significantly affect the overall length of the actuator, which can result in the effective disablement of the automatic release function or providing premature automatic release.

It is an object of the present invention to provide an improved automatic release function in a holddown mechanism incorporated in a dock leveler assembly. It is a further object of the invention to provide an automatic release mechanism which is capable of being adjusted so as to accommodate manufacturing tolerances or other variations in components incorporated in the automatic release mechanism. Yet another object of the invention is to provide such an automatic release mechanism which functions in a manner similar to prior art automatic release mechanisms. Yet another object of the invention is to provide such an automatic release mechanism which can be calibrated during manufacture and thereafter retrofitted into an existing dock leveler assembly. A still further object of the invention is to provide a method of calibrating or adjusting an automatic release mechanism so as to provide consistent and reliable operation, either during original manufacture of the dock leveler or when retrofitting an existing dock leveler with a replacement holddown assembly.

The present invention features an automatic release mechanism for a dock leveler assembly as described above. The dock leveler assembly includes a release member movably interconnected with one of the first and second members of the holddown mechanism, for movement between an inoperative position for maintaining the releasable engagement arrangement in an engaged position to prevent movement between the first and second members, and an operative position for moving the releasable engagement arrangement to a disengaged position for allowing movement between the first and second members. The automatic release mechanism of the present invention includes an adjustable actuator member that defines a first end interconnected with one of the first and second members, and a second end interconnected with the release member. The effective length of the actuator member between the first and second ends is adjustable, which enables variation in the inoperative position of the release member. This adjustability in the inoperative position of the release member functions to control the degree of movement of the release member that is required for moving the release member to the operative position, in which the release member moves the releasable engagement arrangement to the disengaged position for allowing movement between the first and second members of the holddown mechanism, and thereby upward movement of the ramp when an upward force is applied to the ramp.

The release member is pivotable between the operative and inoperative positions, and the second end of the adjustable actuator member is interconnected with the release member at a location offset from the pivot axis about which the release member is pivotable. When the ramp member is in a lowered position, application of an upward force above a predetermined threshold functions to apply tension to the actuator member so as to cause the actuator member to pivot the release member from the inoperative position to the operative position, so as to disengage the releasable engagement arrangement and to allow movement between the first and second members of the holddown assembly, and thereby movement of the ramp member away from the lowered position partially toward the raised position. When the applied upward force falls below the predetermined threshold, the release member returns to the inoperative position to allow engagement of the releasable engagement arrangement so as to maintain the relative position of the first and second members of the holddown mechanism.

The adjustable actuator member includes a threaded adjustment mechanism interposed between the fixed end of the holddown mechanism and the release member. The threaded adjustment mechanism includes a threaded adjustment member engaged with the second end of the actuator member, a sleeve member secured to the release member through which the threaded adjustment member extends, and a threaded receiver engaged with the threaded adjustment member and with the sleeve member. In this manner, rotation of the threaded receiver relative to the threaded adjustment member functions to vary the effective length of the actuator member, to adjust the degree of movement of the release member that is required in order to place the release member in the operative position.

In accordance with another aspect of the invention, the inoperative position of a release member in an automatic release mechanism is adjusted so as to control the degree of movement of the release member that is required to disengage the releasable engagement arrangement of the holddown mechanism. Adjustment in the inoperative position of the release member is carried out by varying the effective length of the automatic actuator member, preferably in accordance with the foregoing summary.

The invention also contemplates a dock leveler assembly incorporating an automatic release mechanism, also in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

The adjustable automatic release feature of the present invention is adapted to be used with any type of dock leveler having a holddown mechanism that maintains the ramp of the dock leveler in a lowered position against an upward bias that tends to raise the ramp. The drawings and the following detailed description illustrate the adjustable automatic release feature employed in connection with a dock leveler having a certain illustrative construction, and it is understood that the adjustable automatic release feature may be used in connection with various types of dock leveler assemblies that vary from the specific construction as shown and described.

Figure 1:
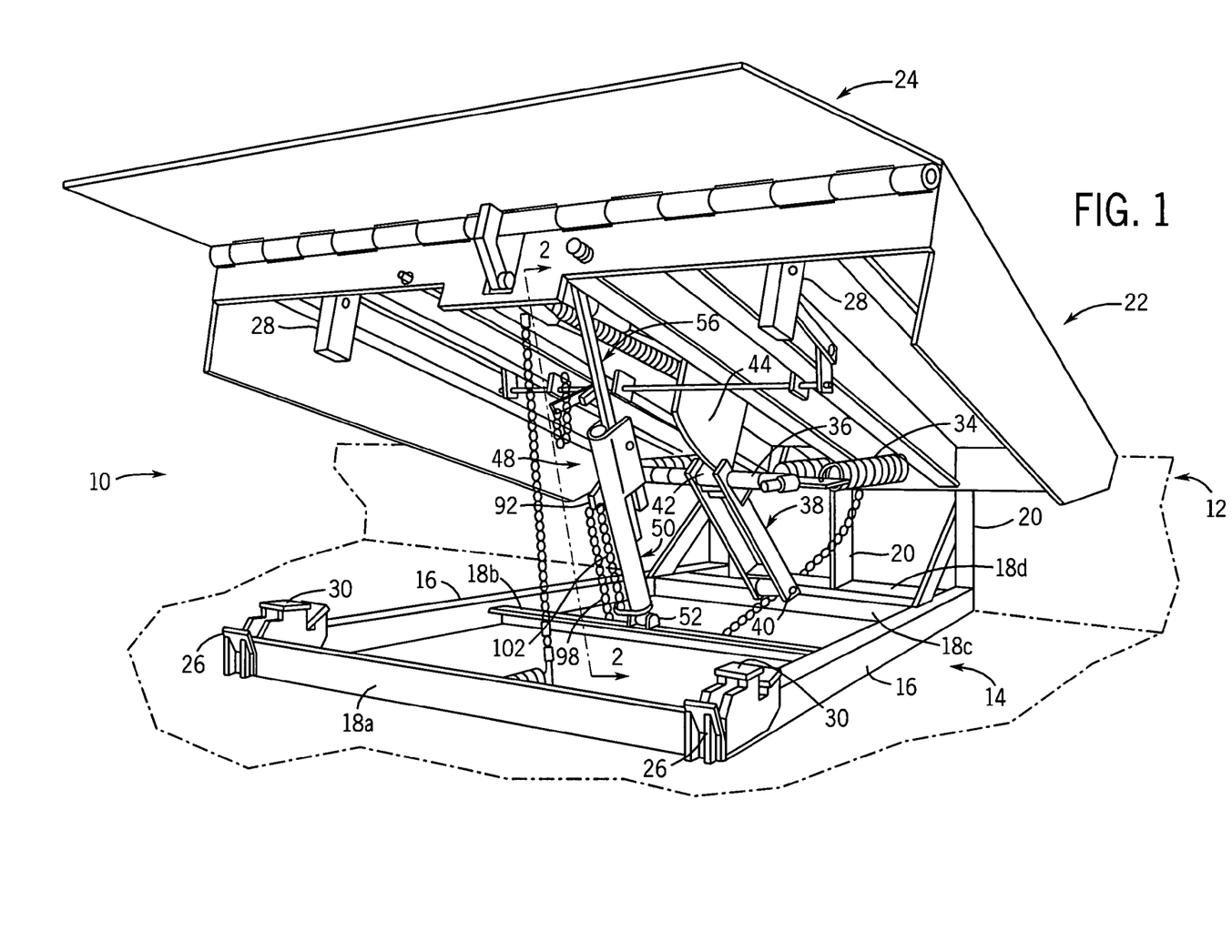
FIG. 1 is an isometric view of a dock leveler assembly incorporating a holddown device having an adjustable automatic release mechanism in accordance with the present invention.

As shown in FIG. 1, a dock leveler assembly 10 is mounted to a loading dock 12, in a manner as is known. Dock leveler assembly 10 includes a frame or base 14 secured within a loading dock recess, e.g. to the front and back of the recess. Base 14 includes a pair of spaced side members 16 and a series of transverse members 18a, 18b, 18c and 18d that extend between side members 16, in a manner as is known. A series of vertical ramp-mounting members 20 extend upwardly from rear transverse member 18d, and a ramp 22 is pivotably mounted to the upper end of each ramp-mounting member 20, in a known manner. A lip 24 is pivotably mounted at the front end of ramp 22, for movement between an extended, operative position as shown and a depending, inoperative position. When ramp 22 is not in use, lip 24 is engaged with a pair of lip retainers 26 located forwardly of transverse member 18a. In addition, ramp 22 includes a pair of feet 28 that engage upwardly facing stops 30 located adjacent retainers 26.

In a manner as is known, a series of springs 34 are interconnected between base 14 and ramp 22, such as between the rear end of ramp 22 and a cross bar 36, to bias ramp 22 upwardly toward a raised position. A follower 38 is pivotably connected at 40 and includes a roller 42 at its outer end, which engages the edge of a cam plate 44 connected to the underside of ramp 22.

Figure 2:
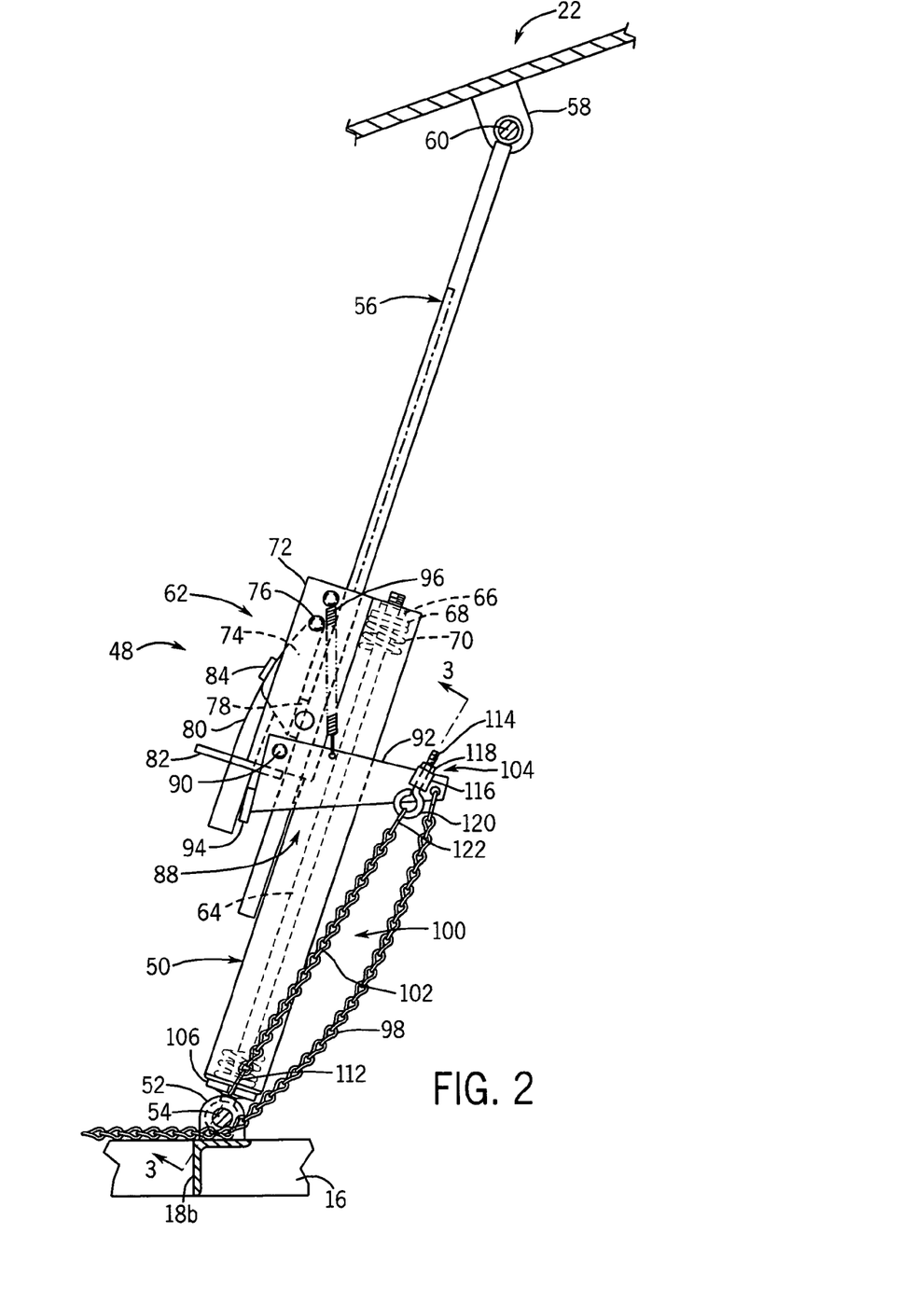
FIG. 2 is a side elevation view of the holddown device incorporated in the dock leveler assembly of FIG. 1.

In order to maintain ramp 22 in a desired angular orientation relative to base 14 against the force of springs 34, a holddown assembly 48 is interconnected between base 14 and ramp 22. Holddown assembly 48 includes a lower member 50 that is pivotably connected at its lower end, e.g. by connection to transverse member 18b via a bracket 52 and a pin 54, which extends through an eye 55 located at the lower end of lower member 50. Holddown assembly 48 further includes an upper member 56 that is extendible and retractable relative to lower member 50, and which is pivotably interconnected at its upper end with ramp 22, e.g. via a bracket 58 and pin 60. It is understood that the illustrated manner of mounting holddown assembly 48 is illustrative, and that holddown assembly 48 may be connected between ramp 22 and base 14 in any satisfactory manner.

It is also understood that, as noted above, the general construction of dock leveler assembly 10 as shown and described is illustrative, and that the configuration and details of construction of the dock leveler may vary from the configuration and details as shown and described.

A releasable engagement arrangement, shown generally at 62, is interposed between lower member 50 and upper member 56, for selectively maintaining the position of upper member 56 relative to lower member 50 so as to selectively fix ramp 22 in a predetermined angular position relative to base 14.

Figures 3, 4:
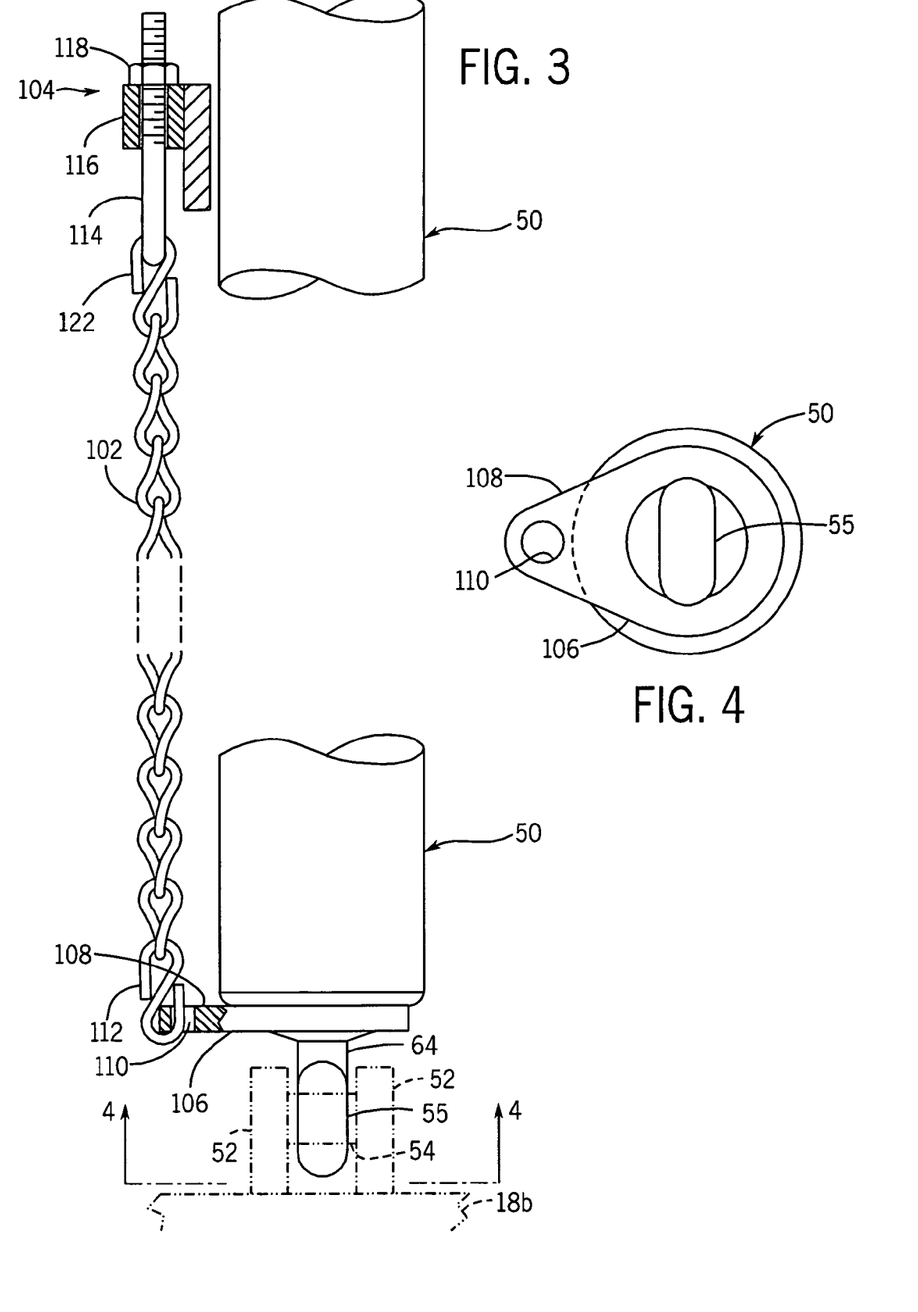
FIG. 3 is a partial section view taken along line 3—3 of FIG. 2.
FIG. 4 is an end elevation view of the lower end of the holddown device shown in FIG. 2, with reference to line 4—4 of FIG. 3.

Lower member 50 has a tubular construction, defining an internal passage within which a rod 64 is received. The lower end of rod 64 extends through the end wall of lower member 50 and is secured to eye 55, through which pin 54 extends so as to interconnect rod 64 with brackets 52. A nut 66 is engaged with the threaded upper end of rod 64, and bears against a washer 68. A spring 70 bears between washer 68 and the lower end wall of lower member 50.

Releasable engagement arrangement 62 includes a pair of plates 72 between which upper member 56 is located. A pawl member 74 is pivotably connected between plates 72 at 76, and includes a jaw plate 78 having a series of teeth that face and engage teeth formed on upper member 56, in a known manner. A rocker arm 80 is pivotably mounted between plates 72 at 76 along with pawl member 74, and is movable within a slot formed in an end plate 82 connected to the ends of side plates 72. Pawl member 74 includes a cross member 84 that overlies rocker arm 80. Pawl member 74 is movable between an engaged position as shown, in which the teeth of jaw plate 78 engage the teeth of upper member 56, and a disengaged position in which jaw plate 78 is moved away from upper member 56 so as to disengage the teeth of jaw plate 78 from the teeth of upper member 56.

A release member 88 is pivotably mounted to plates 72 at 90. Release member 88 includes a side plate 92 and a cross member 94, and is biased toward an inoperative position, as shown in FIG. 2, via a spring 96 which is engaged at one end with one of plates 72 and at its opposite end with side plate 92. In the inoperative position, release member 88 is disengaged from rocker arm 80 so as to maintain pawl member 74 in the engaged position. Release member 88 is movable to an operative position against the force of spring 96, in which cross member 94 engages rocker arm 80 toward its outer end to pivot rocker arm 80 about pivot 76, causing rocker arm 80 to engage cross member 84 and to move pawl member 74 to the disengaged position.

In order to move release member 88 to the operative position, a manually operable flexible member, which may be in the form of a cable or a chain 98, is engaged with release member side plate 92 toward its outer end. At its opposite end, chain 98 defines a free end that is accessible from above ramp 22, which is configured to be pulled by an operator when it is desired to alter the position of ramp 22.

During normal use, the operator applies tension to chain 98 to move release member 88 to the operative position, to thereby move pawl member 74 to the disengaged position via engagement of rocker arm 80 with cross member 84, against the force of spring 96. This enables ramp 22 to be raised under the influence of springs 34. In accordance with known construction, lip 24 is moved to an extended position when ramp 22 is raised. The operator then walks outwardly on ramp 22, such that the weight of the operator functions to lower ramp 22 as the operator moves outwardly on ramp 22. Ramp 22 is lowered until lip 24 comes into contact with the top of the truck bed.

Before walking out on ramp 22, the operator releases chain 98, to allow release member 88 to return to the inoperative position under the influence of spring 96. Pawl member 74 then returns to the engaged position in which the teeth of jaw plate 78 engage the teeth of upper member 56. The teeth of jaw member 78 and second member 56 have a complementary configuration, to provide ratchet-type engagement of the teeth of jaw plate 78 with the teeth of upper member 56 as ramp 22 is lowered.

In accordance with the present invention, an automatic actuator arrangement, shown generally at 100, is interconnected with release member 88 for automatically moving pawl member 74 to the disengaged position when an upward force is applied to ramp 22 after ramp 22 has been lowered into engagement with the truck bed. Normally, such an upward force may be applied as a result of unloading of the truck bed, such that the truck springs function to elevate the truck bed as the load supported by the truck bed is lessened. In circumstances such as this, automatic actuator arrangement 100 functions to allow ramp 22 to automatically elevate under the influence of springs 34.

Automatic actuator arrangement 100 includes a flexible elongated actuator member, in the form of a cable or a chain 102, which is interconnected with side plate 92 of release member 88 via an adjustment arrangement 104. While automatic actuator arrangement 100 is shown as including a flexible actuator member, it is also understood that the actuator member may be in any other form, e.g. a rod, tube or the like.

At its lower end, chain 102 is fixed in position via a mounting plate 106 that is fixed to rod 64. Mounting plate 106 has a lateral extension 108 located outwardly of the side wall of lower member 50. An opening 110 is formed in lateral extension 108, and an S-hook 112, or any other suitable fastening device, is engaged in opening 110. The lower end of chain 102 is secured to the upper end of S-hook 112. It should be understood that this manner of mounting the lower end of chain 102 is representative of many different ways in which the lower end of chain 102 may be fixed in position.

Adjustment arrangement 104, which is engaged with the opposite end of chain 102, includes a threaded adjustment member 114 that extends through a sleeve 116 secured to release member side plate 92. A receiver, in the form of a nut 116, is engaged with the threads of adjustment member 114 and with sleeve 116. Adjustment member 114 further includes an eye 120, or any other suitable fastening device, which is engaged with the upper end of chain 102 via a hook 122. Again, the details by which the upper end of chain 102 is fixed to side plate 92 may vary from those shown and described, so long as the upper end of chain 102 is fixed to side plate 92 via a variable position arrangement that allows the effective length of chain 102 to be varied.

Figure 5:
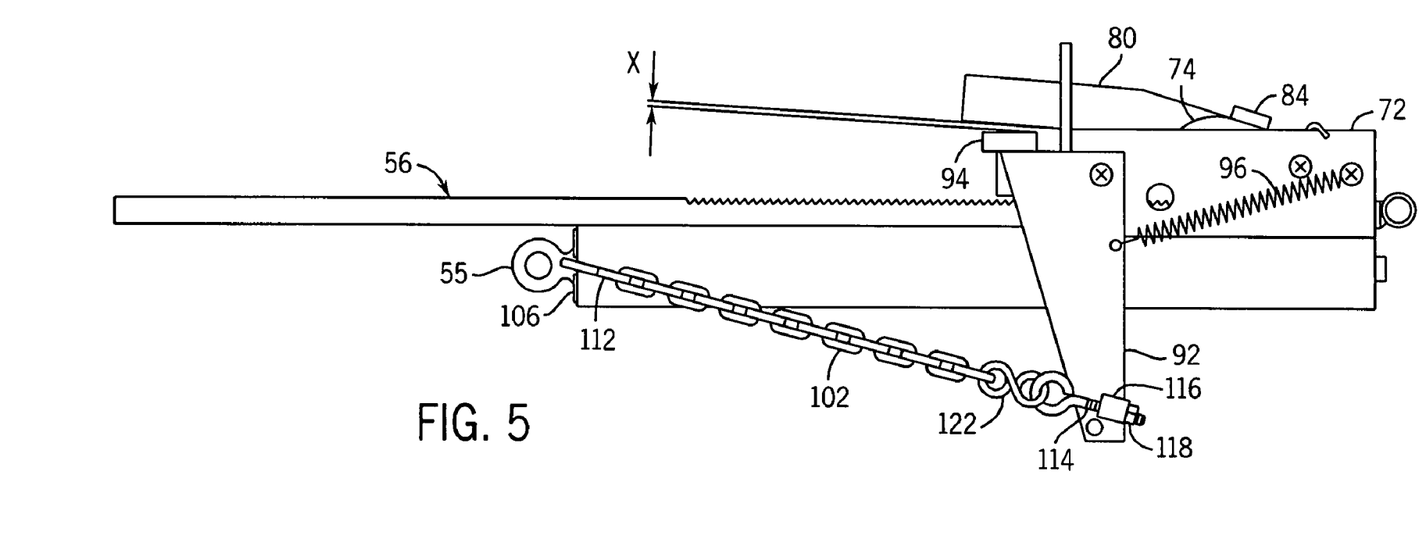
FIG. 5 is a side elevation view of the holddown device of FIG. 2, showing adjustment of the automatic actuating arrangement so as to control the degree of movement required to move the release member from the inoperative position to the operative position.

Adjustment arrangement 104 enables adjustment in the effective length of adjustable actuating arrangement 100, so as to accommodate manufacturing tolerances in chain 102 as well as adjustment member 114 and sleeve 116, and in the components of releasable engagement arrangement 62, including rocker arm 80, pawl member 74, side plate 92, etc. By altering the effective length of automatic actuating arrangement 100, the inoperative position of release member 88 is adjusted relative to rocker arm 80, to thereby control the amount of movement of release member 88 that is required in order to move release member 88 to its operative position in which release member 88 moves rocker arm 80 so as to place releasable engagement arrangement 62 in the disengaged position. Such adjustment in the effective length of automatic actuating arrangement 100 is accomplished by turning nut 118 relative to the threads of adjustment member 114, which causes pivoting movement of release member 88 about pivot 90 so as to vary the position of release member 88, and more specifically varies the position of cross member 94 relative to rocker arm 80. Loosening of nut 118 functions to cause release member 88 to pivot in a counterclockwise direction under the influence of spring 96 so as to increase the spacing between cross member 94 and rocker arm 80, whereas tightening of nut 118 functions to move release member 88 in a clockwise direction against the force of spring 96, to decrease the spacing between cross member 94 and rocker arm 80.

In operation, when ramp 22 is lowered and an upward force is applied to ramp 22, typically by upward movement of the truck bed against the underside of lip 24, such upward movement causes upper member 56 and lower member 50 of holddown assembly 48 to move upwardly, against the force of spring 70 contained within the internal passage of lower member 50. Mounting plate 106 is fixed to rod 64, such that lower member 50 moves upwardly relative to mounting plate 106. Such upward movement of lower member 50 causes release member 88 to move upwardly, and automatic actuating arrangement 100, i.e. chain 102, is tensioned so as to cause release member 88 to move downwardly from the inoperative position to the operative position against the force of spring 96. This functions to apply a force to the end of rocker arm 80 through cross member 94, to thereby move pawl member 74 to the disengaged position and to allow extension of upper member 56 relative to lower member 50. When the upward force on ramp 22 is relieved, spring 96 returns release member 88 to the inoperative position in which cross member 94 is disengaged from the end of rocker arm 80, and pawl member 74 is then returned to the engaged position in which the teeth of jaw plate 78 engage the teeth of upper member 56, to subsequently retain ramp 22 in a lowered position which is elevated relative to the previous lowered position of ramp 22, but in which the upward force on ramp 22 is relieved. This sequence repeats as necessary during unloading of the truck bed, to accommodate subsequent changes in elevation of the truck bed during unloading. In this manner, holddown mechanism 48 is isolated from the upward forces applied to ramp 22 during loading or unloading of the truck, to prevent serious damage to the components of holddown mechanism 48 that may otherwise occur.

It can thus be appreciated that the present invention provides a relatively simple and efficient system for setting the inoperative position of release member 88, to provide consistent operation of automatic actuating arrangement 100. Preferably, the setting of automatic actuating arrangement 100 is accomplished when holddown assembly 48 is assembled, so as to enable the preset components of holddown assembly 48 to be installed as a unit between base 14 and ramp 22. However, adjustment can occur after installation by rotating nut 118 on the threads of adjustment member 114. In any event, the calibration of automatic actuating arrangement 100 ensures that holddown mechanism 48 releases prior to application of an upward force to ramp 22 that could otherwise cause damage to the components of holddown mechanism 48, while enabling ramp 22 to move vertically as required during loading or unloading.

In a preferred form, the calibration of automatic actuating arrangement 100 is carried out so as to place a component of release member 88 in a desired position relative to a component of releasable engagement arrangement 62, which is actuated by movement of release member 88. Representatively, the spacing between the end of cross member 94 and the adjacent edge of rocker arm 80 may provide a reference for setting the inoperative position of release member 88, e.g. a spacing of one-eighth (⅛) to one-sixteenth (1/16) inch at dimension X (FIG. 4) has been found to provide the desired position of release member 88 that consistently moves releasable engagement arrangement 62 to the disengaged position upon application of a predetermined upward force on ramp 22. This calibration location is representative, and it is understood that any other spatial relationship between various components may be employed.

While the invention has been shown and described with reference to a specific embodiment, it is understood that various alternatives and modifications are possible and are contemplated as being within the scope of the present invention. For example, and without limitation, while adjustment in the effective length of automatic actuating arrangement 100 is shown as being carried out via rotation of nut 118 relative to the threaded end of adjustment member 114, it is understood that any other type of adjustable length arrangement may be employed, e.g. a turnbuckle arrangement or the like. In addition, while adjustment is shown and described as being carried out by altering the position of cross-member 94 relative to rocker arm 80, it is understood that any other satisfactory parameter may be employed to position release member 88 relative to releasable engagement arrangement 62. Further, while the lower end of chain 102 is being shown as mounted to mounting plate 106, it is contemplated that the end of chain 102 opposite adjustment arrangement 104 may be mounted in any satisfactory manner so as to be fixed in position.

Various alternatives and embodiments are contemplated as being within the scope of the following claims particularly pointing out and distinctly claiming the subject matter regarded as the invention.

We claim:

1. A dock leveler assembly, comprising:
   a base;
   a ramp pivotably mounted to the base for movement between a raised position and a lowered position;
   a biasing arrangement for urging the ramp toward the raised position;
   a holddown mechanism for selectively maintaining the ramp in a lowered position against the force of the biasing arrangement, including a first member mounted to one of the ramp and the base; a second member mounted to the other of the ramp and the base, wherein the position of the first and second members relative to each other varies in response to movement of the ramp relative to the base; and a selectively operable engagement arrangement interposed between the first and second members and movable between an engaged position for selectively preventing relative movement between the first and second members so as to selectively maintain the position of the ramp relative to the base, and a disengaged position for allowing movement between the first and second members to enable movement of the ramp relative to the base; and
   an automatic actuating arrangement for moving the engagement arrangement to the disengaged position in response to application of an upward force on the ramp when the ramp is in a lowered position and the engagement arrangement is in the engaged position, wherein the automatic actuating arrangement includes:
   a movable release member movably mounted adjacent the engagement arrangement, wherein the release member is movable between an inoperative position and an operative position, wherein the release member is configured and arranged such that the release member in the inoperative position maintains the engagement arrangement in the engaged position to maintain the position of the ramp relative to the base, and such that the release member in the operative position functions to position the engagement arrangement in the disengaged position to enable upward movement of the ramp relative to the base;
   wherein the movable release member is movably mounted adjacent the engagement arrangement for movement throughout a range of inoperative positions;
   an actuator arrangement interconnected with the release member, wherein the actuator arrangement includes an elongated actuator member that acts on the release member to selectively move the release member from the inoperative position to the operative position in response to an upward force on the ramp; and wherein the elongated actuator member of the actuator arrangement defines an effective length between a first end that is interconnected with one of the first and second members and a second end that is interconnected with the movable release member, and wherein the actuator arrangement further includes an adjustment mechanism in the form of a length adjustment arrangement associated with the elongated actuator member, wherein the length adjustment arrangement is configured and arranged to enable adjustment in the effective length of the actuator member between the first and second ends, wherein an adjustment in the effective length of the elongated actuator member by operation of the length adjustment arrangement moves the release member to a selected inoperative position within the range of inoperative positions of the release member, to enable calibration of the automatic actuating arrangement.

2. The dock leveler assembly of claim 1, wherein the elongated actuator member comprises a flexible member that is configured and arranged such that application of an upward force to the ramp member causes tension in the elongated actuator member to move the release member from the inoperative position to the operative position.

3. The dock leveler assembly of claim 1, wherein the adjustment arrangement comprises a threaded adjustment member interconnected with the second end of the elongated actuator member and engaged with the release member.

4. The dock leveler assembly of claim 2, wherein the threaded adjustment member extends through a sleeve mounted to the release member, and wherein a threaded receiver is engaged with the threaded adjustment member and with the sleeve, wherein rotation of the threaded receiver relative to the threaded adjustment member is operable to effect movement of the release member to adjust the inoperative position of the release member.

5. The dock leveler assembly of claim 2, wherein the first end of the elongated actuator member is engaged with a mounting member secured to one of the first and second members of the holddown mechanism.

6. The dock leveler assembly of claim 2, wherein the release member is engaged with a biasing member that biases the release member toward the operative position, wherein tension in the elongated actuator member moves the release member from the inoperative position to the operative position against the force of the biasing member.

* * * * *

UNITED STATES PATENT AND TRADEMARK OFFICE
CERTIFICATE OF CORRECTION

PATENT NO.   : 6,973,693 B1
DATED        : December 13, 2005
INVENTOR(S)  : William B. Mayer et al.

It is certified that error appears in the above-identified patent and that said Letters Patent is hereby corrected as shown below:

Column 10,
Lines 7 and 15, delete "2" and substitute -- 3 --.

Signed and Sealed this

Thirty-first Day of January, 2006

JON W. DUDAS
*Director of the United States Patent and Trademark Office*